US010185468B2

(12) United States Patent
Schneider, IV et al.

(10) Patent No.: US 10,185,468 B2
(45) Date of Patent: Jan. 22, 2019

(54) ANIMATION EDITOR

(71) Applicant: Microsoft Technology Licensing, LLC, Redmond, WA (US)

(72) Inventors: Frederick William Schneider, IV, New York, NY (US); Jakob O. Engstrand, New York, NY (US)

(73) Assignee: Microsoft Technology Licensing, LLC, Redmond, WA (US)

(*) Notice: Subject to any disclaimer, the term of this patent is extended or adjusted under 35 U.S.C. 154(b) by 314 days.

(21) Appl. No.: 14/863,094

(22) Filed: Sep. 23, 2015

(65) Prior Publication Data

US 2017/0083172 A1    Mar. 23, 2017

(51) Int. Cl.
*G06F 3/0482* (2013.01)
*G06F 3/0484* (2013.01)
*G06F 3/0481* (2013.01)
*G06T 13/80* (2011.01)

(52) U.S. Cl.
CPC ........ *G06F 3/0482* (2013.01); *G06F 3/04812* (2013.01); *G06F 3/04847* (2013.01); *G06T 13/80* (2013.01); *G06T 2200/24* (2013.01)

(58) Field of Classification Search
CPC .... G06F 3/0482; G06T 13/80; G06T 2200/24
See application file for complete search history.

(56) References Cited

U.S. PATENT DOCUMENTS

| | | | |
|---|---|---|---|
| 7,042,468 B2 | 5/2006 | Schwegler, Jr. et al. | |
| 7,162,690 B2 | 1/2007 | Gupta et al. | |
| 8,677,241 B2 | 3/2014 | Norton et al. | |
| 8,745,500 B1* | 6/2014 | Kostello | G11B 27/031 386/282 |
| 2004/0001079 A1* | 1/2004 | Zhao | G11B 27/034 715/719 |
| 2006/0064716 A1 | 3/2006 | Sull et al. | |
| 2013/0019177 A1 | 1/2013 | Schlossberg et al. | |
| 2017/0024110 A1* | 1/2017 | Xu | G06F 3/04817 |

FOREIGN PATENT DOCUMENTS

WO    2013138370 A1    9/2013

OTHER PUBLICATIONS

"How to use the Animated Gif Editor / Gif Animator", Retrieved on: Aug. 21, 2015 Available at: http://gifrecorder.com/help/help.htm? http://gifrecorder.com/help/animated_gif_editor.htm.
"Video Manipulation and Delivery", Published on: Aug. 14, 2015 Available at: http://cloudinary.com/documentation/video_manipulation_and_delivery#video_transformations_reference.

(Continued)

*Primary Examiner* — Roland J Casillas
(74) *Attorney, Agent, or Firm* — Schwegman Lundberg & Woessner, P.A.

(57) ABSTRACT

A user device comprising a user interface generator configured to generate a user interface for designing an animated meme comprising a sequence of images and at least one text layer overlaid on at least some of the sequence of images, the user interface comprising an edit frame comprising: an image sequence overlay configured to display an arrangement of selected images from the sequence of images and at least one slider associated with a text layer configured to define when the text layer is to be displayed over the sequence of images.

16 Claims, 8 Drawing Sheets

(56) References Cited

OTHER PUBLICATIONS

Buhl, Taber, "Giffer—Animated GIF Maker App", Retrieved on: Aug. 21, 2015 Available at: https://itunes.apple.com/us/app/giffer-animated-gif-maker-app/id416952536?mt=8.
Paul, Ian, "YouTube quietly rolls out a Native GIF Creation Tool", Published on: Dec. 12, 2014 Available at: http://www.pcworld.com/article/2858491/youtube-quietly-rolls-out-a-native-gif-creation-tool.html.
Castle, Alex, "How to Create a High-Quality Animated GIF", Published on: Nov. 8, 2014 Available at: http://www.pcworld.com/article/2842792/how-to-create-a-high-quality-animated-gif.html.
"VISCOM Photo", Retrieved on: Aug. 21, 2015 Available at: http://viscom-photo.software.informer.com/.
"Synchronize the Appearance of Overlay Text in your Video", Retrieved on: Aug. 21, 2015 Available at: https://support.office.com/en-in/article/Synchronize-the-appearance-of-overlay-text-in-your-video-132cafba-e343-4826-b54d-a5191bc031a3.
Leaning, Brittany, "How to Add Text to a GIF Using Photoshop", Published on: Sep. 3, 2014 Available at: http://blog.hubspot.com/marketing/add-text-animated-gif-photoshop-tutorial.
"ImageWorx", Retrieved on: Aug. 21, 2015 Available at: http://imageworx.software.informer.com/.
Renji, et al., "Edit Animated GIF Images to Add Text, Resize, Crop, and More", Published on: Dec. 31, 2012 Available at: http://sumtips.com/2012/12/edit-animated-gif-images-online.html.

\* cited by examiner

ANIMATION EDITOR

BACKGROUND

For some time now, mobile devices such as smartphones and tablets have incorporated touchscreen technology. Such devices are small and portable, and as such have relatively small touchscreen displays that are designed to be used by only one user at a time.

The touch inputs may for example be applied using a finger or stylus. The operation of such a device is typically controlled at least in part by software executed on a processor of the display device. The software controls the display of the display device, when execute, to provide a graphical user interface (GUI) to the users.

Furthermore editing sequences of images and video on smart phones and tablets typically is problematic because of the limited screen size. For example adding text or overlays to a sequence of images to generate an animated meme can prove problematic especially with regards to controlling when the overlay is to be located relative to the sequence of images, when the overlay is to be removed, and furthermore the relationship between different overlays.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a user device comprising a user interface generator configured to generate a user interface for designing an animated meme comprising a sequence of images and at least one text/object layer overlaid on at least some of the sequence of images, the user interface comprising an edit frame comprising: at least one text/object overlay associated with a text/object layer, wherein the at least one text/object overlay displays an entered text/object field to be overlaid over the images; and an image sequence overlay configured to display an arrangement of selected images from the sequence of images and at least one slider associated with a text/object layer configured to define when the text/object layer is to be displayed over the sequence of images. In some of these aspects, the slider is longitudinally adjacent to a first longitudinal side of one or more images of the sequence of images, with first and second pointers extending orthogonally from the slider and past a second longitudinal side of the one or more images.

According to a second aspect there is provided a method for generating a user interface for designing an animated meme comprising a sequence of images and at least one text/object layer overlaid on at least some of the sequence of images, the generating of the user interface comprising generating an edit frame comprising: generating at least one text/object overlay associated with a text/object layer, wherein the at least one text/object overlay displays an entered text/object field to be overlaid over the images; and generating an image sequence overlay configured to display an arrangement of selected images from the sequence of images and at least one slider associated with a text/object layer configured to define when the text/object layer is to be displayed over the sequence of images. In some of these aspects, the slider is longitudinally adjacent to a first longi- tudinal side of one or more images of the sequence of images, with first and second pointers extending orthogo- nally from the slider and past a second longitudinal side of the one or more images.

According to a third aspect there is provided a method for designing an animated meme comprising a sequence of images and at least one text/object layer overlaid on at least some of the sequence of images comprising: generating of the user interface comprising generating an edit frame comprising: at least one text/object overlay associated with a text/object layer, wherein the at least one text/object overlay displays an entered text/object field to be overlaid over the images; and an image sequence overlay configured to display an arrangement of selected images from the sequence of images and at least one slider associated with a text/object layer configured to define when the text/object layer is to be displayed over the sequence of images; and generating an animated image comprising the sequence of images and the at least one text/object layer based on inputs from the user interface edit frame. In some of these aspects, the slider is longitudinally adjacent to a first longitudinal side of one or more images of the sequence of images, with first and second pointers extending orthogonally from the slider and past a second longitudinal side of the one or more images.

DETAILED DESCRIPTION OF EMBODIMENTS

Figure 1:
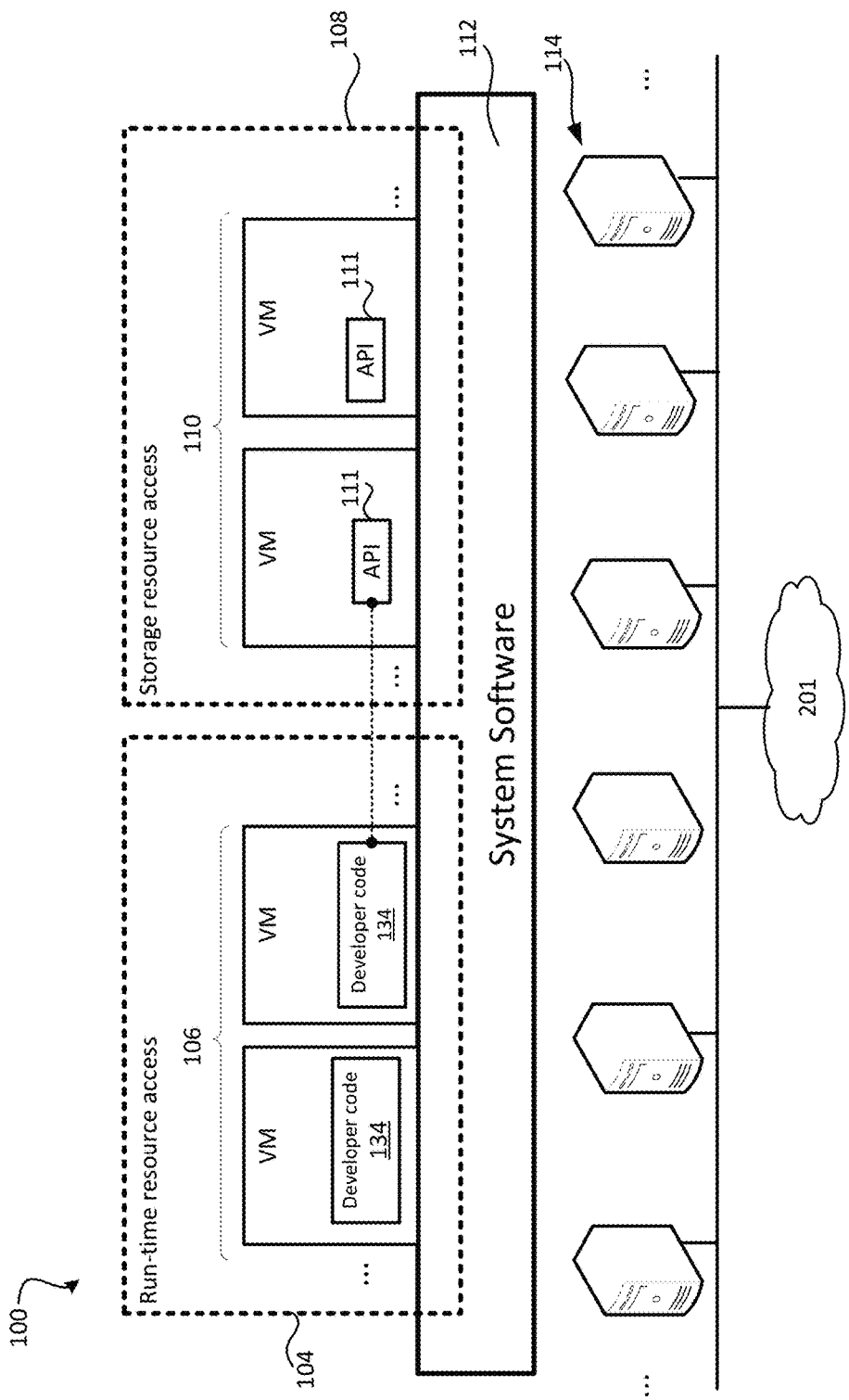
FIG. 1 is a schematic overview of a cloud platform.

When setting up a media communication event such as generating and transferring an animated meme between endpoints of a network, a number of decisions have to be made taking into account multiple factors and variables including whether parties should be allowed to contact one another, what codecs to use, how to route media packets from one party endpoint to another etc. The embodiments described below provide centralized (as opposed to end-point based) control of real-time media communication events from within a "distributed platform" otherwise referred to as a "cloud platform" or simply a "cloud". That is, the communication is controlled by various central controllers running on the cloud.

A cloud means a computing platform, accessible via a network (e.g. the Internet), which includes a distributed computer system comprised of multiple networked computer devices and system software running thereon, the computer system providing a (potentially very large) pool of physical computing resources—such as physical processing resources and physical memory/storage resources, volatile and/or non-volatile—and the system software being configured to partition this underlying physical resource pool by implementing multiple independent virtual machines (VMs)

i.e. software emulations of computer systems. Examples of cloud providers include Windows Azure™, Amazon Web Services™ etc.

This pooling of physical computer resources, and partitioning of that pool through virtualization act to decouple hardware and software considerations due to a virtualization layer (realized by the system software of the platform) providing separation of physical computer resources (e.g. available physical processor clock cycles and physical bits of memory) from 'virtual' resources—that is, resources actually be seen within each virtual computer system. Physical resources of the underlying hardware can be augmented by way of addition of new physical network computer devices, or upgrading of existing physical networked computer and the only considerations that need to be made in terms of legacy compatibility are of ensuring that the upgraded physical computer systems can still run the same generic virtual machines (i.e. without any consideration of what operating systems or application code are going to be run on those virtual machines). Similarly, a system designer can design systems (possibly extremely complex systems with many components), and develop code in relation thereto, for implementation on the cloud platform free from physical hardware considerations (such as ordering, deploying and housing physical servers etc.)—the system designer need only consider consumptions of computer resources in terms of resource limitations of virtual computer systems (not resource limitations of the underlying hardware), resource limitations of those virtual systems being well-defined and known. Thus, from the perspective of the systems designer, computer resource considerations are reduced to considerations of e.g. how many virtual computer systems of the cloud platform should be deployed; from the perspective of an operator of the platform itself (who may be different from the systems designer), computer resources are reduced to considerations of e.g. how many physical computer systems are needed to implement a required number of virtual machines having pre-defined resource allocations.

A high-level overview of an exemplary distributed platform 100 is shown in FIG. 1. The exemplary platform includes a distributed computer system 114. The computer system 114 of FIG. 1 is comprised of a very large number (e.g. tens of thousands) of networked computer devices—large enough that the physical computing resources can, in some contexts, be considered sufficiently plentiful as to be effectively unlimited. These computer devices are configured for communication with a network 201 (which is a packet-based network, e.g. the Internet) and are globally distributed (e.g. spread across multiple countries and/or continents). Typically, groups of such computer systems (e.g. thousands of servers) are housed in respective data centres (datacentre) at different geo-locations (i.e. in different regions of a country, different countries, different continents etc.)

System software 112 runs on top of the distributed computer system 114. The system software 112 is configured to implement two sets 104 (runtime set) and 108 (storage set) of independent, virtual machines 106, 110.

The runtime set 104 comprises multiple VMs 106 which provide runtime environments for execution of application code 134, the application code 134 being executed on that virtual computer system 106. The system software 112 is configured to enable a software developer, desiring to make use of the platform 100, to upload their bespoke code 134 via the network 201 to the platform 100 for execution thereon. In response, the system software 812 creates such a runtime environment and supplies the code 134 to the newly-created runtime environment for execution. Execution of this code 134 on the virtual system 106 is made possible by the system software mediating access to underlying physical processing resources and physical memory resources (primarily realized at the physical level by physical volatile memory) allocated to that environment.

The storage set 108 comprises multiple virtual machines 110 configured to provide data storage. Each has a corresponding Application Programming Interface (API) 111 which can be used to effect transfer of data to and from the physical memory resources (primarily realized at the physical level by physical non-volatile memory) allocated to that computer system 110 e.g. by code 134 making suitable function calls thereto. This transfer is, again, mediated by the system software 112.

Embodiments provide a system comprising computer storage which holds code configured to implement various types of controller. These include:

1. a call controller which handles high-level signalling functions, e.g. for establishing a communication event, e.g. call between two or more users, and for high-level management of the established communication event, e.g. in-call management, such as adding/removing participants, adding/removing media modalities etc., and terminating the established communication event;
2. one or more a media (modality) controllers, each for managing a media modality of the established communication event; the media modality controllers control the flow of actual media content, under the control of the call controller, for instance by controlling the manner in which overlay network connections (e.g. peer-to-peer and/or relayed connections) are established between participating endpoints; media modalities include audio, video, screen sharing, shared whiteboard etc. In some embodiments, the media modality service is only delivered for group calls (between three or more users).

An instance of a controller is implemented by application code executed on one more VMs of the cloud platform.

That is, Call Controller (CC) is a server entity responsible for call setup & management of two-party calls, and helps with multi-party call setup & management as well.

Call Agent (CA) is the term used to refer to client entities that interact with Call Controller.

Figure 2:
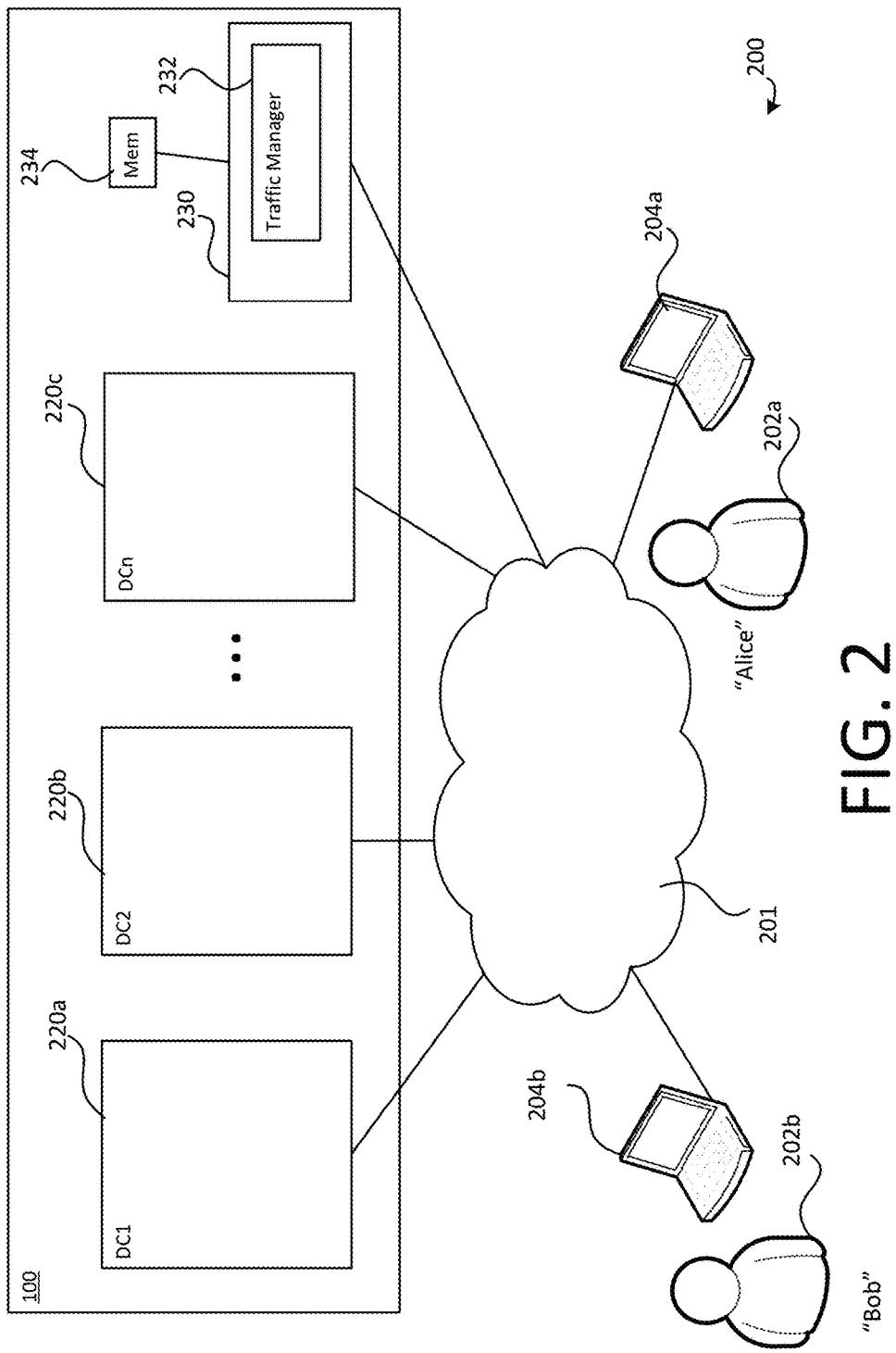
FIG. 2 is a schematic illustration of a communication system.

FIG. 2 shows an example communication system 200. The communication system 200 includes the network 201. Connected to the network 200 are a user device (also referred to as a user device or client device) 204a associated with a first user 302a ("Alice") and a further user device 204b associated with a second user 202b ("Bob"). The user devices 204a, 204b are endpoints of the network 201. The user devices 204a, 204b are arranged to receive information from and output information to the relevant user. Although only two user devices are shown in FIG. 2, many more user devices may be included in communication system 200. Each user derive is a computer device which can take a number of forms e.g. that of a desktop or laptop computer, mobile phone (e.g. smartphone), tablet computing device, wearable computing device, television (e.g. smart TV), set-top box, gaming console etc.

Also connected to network 301 are a plurality of data centres (DCs) 220a, 220b, . . . , 220c and a traffic management system 230. The traffic management system 230 comprises one or more memory devices 234 and one or more processors configured to execute traffic management code 232 (traffic manager/traffic management logic) for managing datacentre traffic as described in more detail below. The traffic management system 230 and the datacentres 220 form part of the distributed platform 800.

Figure 3:
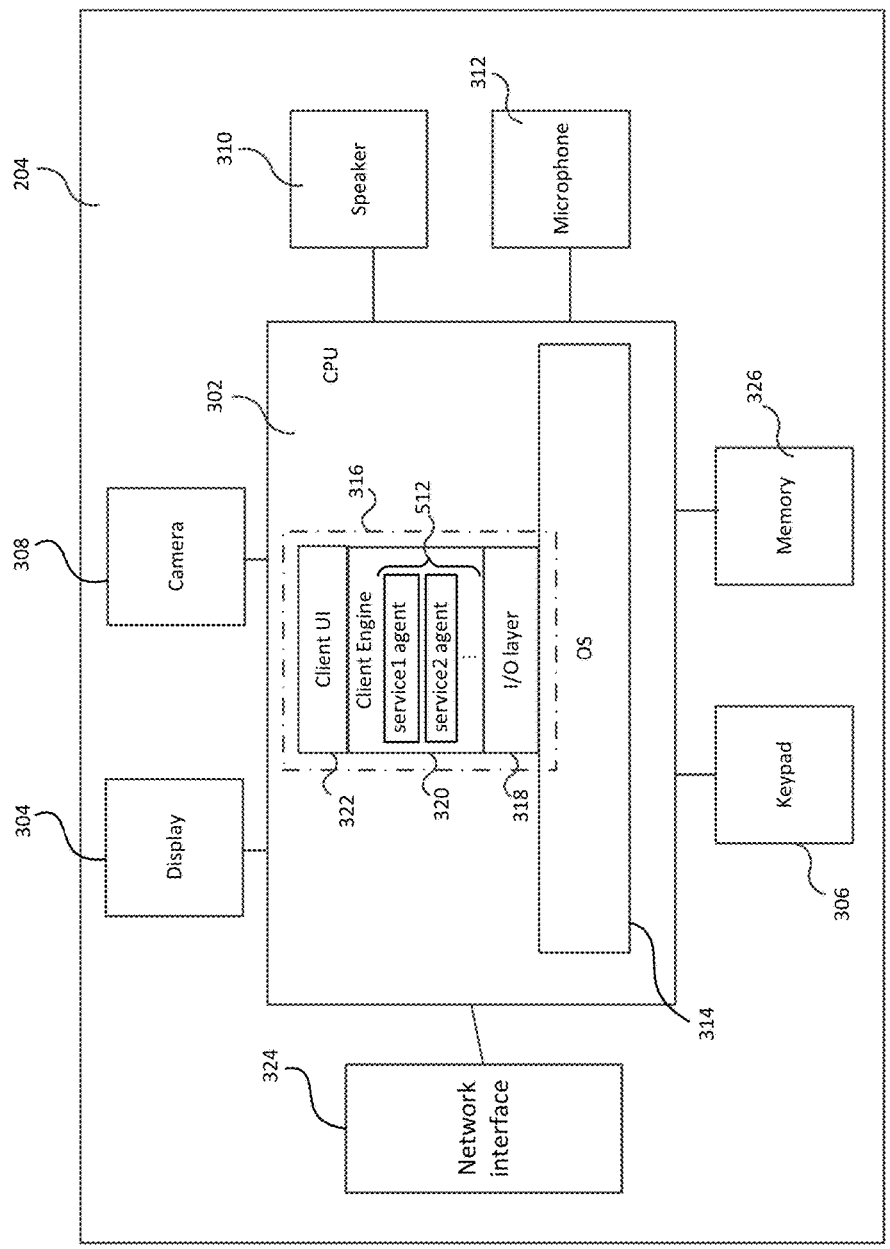
FIG. 3 is a schematic illustration of a user device.

FIG. 3 illustrates a detailed view a user device 204 (such as user devices 204*a* and 204*b*). The user device 204 comprises a central processing unit ("CPU") 302, to which is connected: output devices such as a display 304, which may be implemented as a touch-screen, and a speaker (or "loudspeaker") 310 for outputting audio signals; input devices such as a microphone 326 for receiving audio signals, a camera 308 for receiving image data, and a keypad 306; a memory 326 for storing data; and a network interface 324 such as a modem for communication with the network 201. The user device 204 may comprise other elements than those shown in FIG. 4. The display 304, speaker 310, microphone 312, memory 326, camera 308, keypad 306 and network interface 324 are be integrated into the user device 204. Alternatively, one or more of the display 304, speaker 310, microphone 312, memory 326, camera 308, keypad 306 and network interface 324 may not be integrated into the user device and may be connected to the CPU 302 via respective interfaces. One example of such an interface is a USB interface. If the connection of the user device 204 to the network 201 via the network interface 324 is a wireless connection then the network interface 324 may include an antenna for wirelessly transmitting signals to the network 201 and wirelessly receiving signals from the network 201.

FIG. 3 also illustrates an operating system ("OS") 314 executed on the CPU 302. Running on top of the OS 314 is a software stack 316 of an instance of a communication client application (client) of the communication system 200. The client 316 communicates with the operating system 314 and manages the connections over the communication system 200, including connections with other user devices and with datacentres 220. The client 316 has a client User Interface ("UI") which is used to present information to, and receive information from, a user of the device. The software stack shows a client protocol layer 418, a client engine layer 420 and a client user interface layer 422. Each layer is responsible for specific functions. Because each layer usually communicates with two other layers, they are regarded as being arranged in a stack as shown in FIG. 3. The operating system 314 manages hardware resources of the device 204 and handles data being transmitted to and from the network 201 via the network interface 324. The client protocol layer 318 of the client software communicates with the operating system 314 and manages the connections over the communication system 200. Processes requiring higher level processing are passed to the client engine layer 320. The client engine 320 also communicates with the client user interface layer 322. The client engine 320 is arranged to control the client user interface layer 322 to present information to the user via the user interface of the client and to receive information from the user via the user interface. In this way, the client 216 performs the processing required to allow a user (e.g. Alice, Bob) to generate the animated meme and communicate the animated meme over the communication system 200.

The user interface may comprise, for example, a Graphical User Interface (GUI) which outputs information via the display 304 and/or a Natural User Interface (NUI) which enables the user to interact with a device in a "natural" manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems etc.

The client engine layer comprises a plurality of service agents 512. Each service agent handles a distinct aspect of a media communication event (e.g. call). An agent means the endpoint/client logic implementation that defines how the endpoint interacts with a specific cloud service e.g. a call controller, for a call agent; a media modality controller, for a media modality agent etc. The agents may be embodied in a software library of the client.

The concept embodied in the examples described herein is to provide a suitable user interface for touch screen devices which enable the editing of video (or animated) images in order to generate animated memes which can be saved for later use or communicated over the communications system.

In the following examples the animated meme is communicated between users via the server or distributed computing system. In some embodiments the communication between users may be implemented within a peer-to-peer (p2p) or other point-to-point communications system.

Animated memes are an extension to conventional image memes. Conventional image memes comprise an image background over which text or other objects are placed. The combination of the image and the text or objects aim to present a humorous scene. Animated memes attempt to extend this by using an image sequence (or video images) over which the text or objects are presented. Whereas the image in a conventional image meme is a fixed point in time over which the text or objects are presented the animated meme allows the designer a degree of freedom in placing the text or object in time. In other words the text or object is placed not only in 'space' on the image but also in 'time' along the sequence of images. The user interface for designing such animated memes thus should allow the designer to be able to place the text or objects with respect to the sequence of images. Furthermore the user interface should enable the placement of the text or objects with respect to any other text (or objects) in the animated meme.

In the following examples the animated meme features the insertion of text, however it would be understood that in some embodiments any suitable object or data may be used and inserted over the images.

Figure 4:
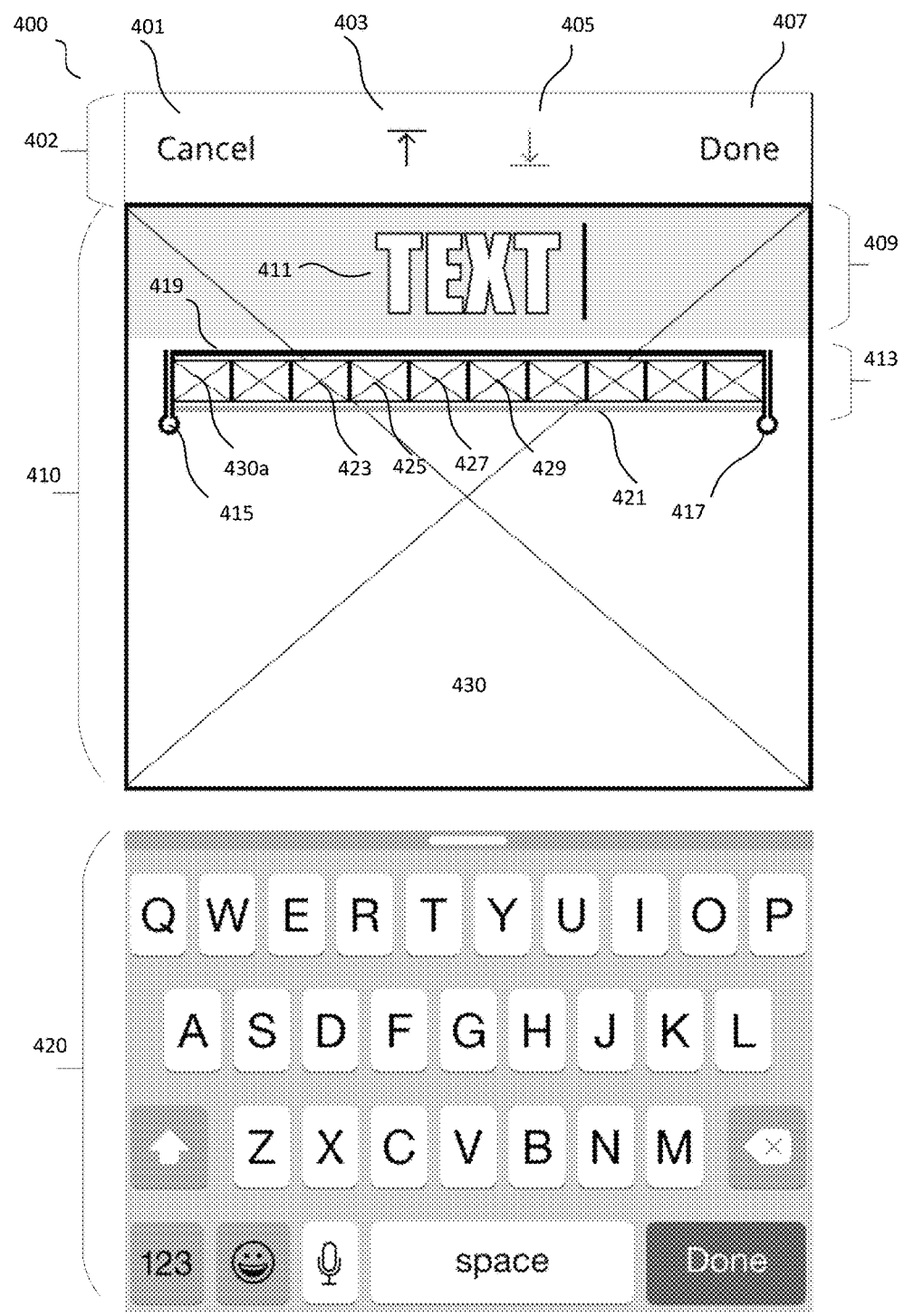
FIGS. 4 to 6 are a schematic illustration of example user interfaces on the user device according to some embodiments.
Figure 5:
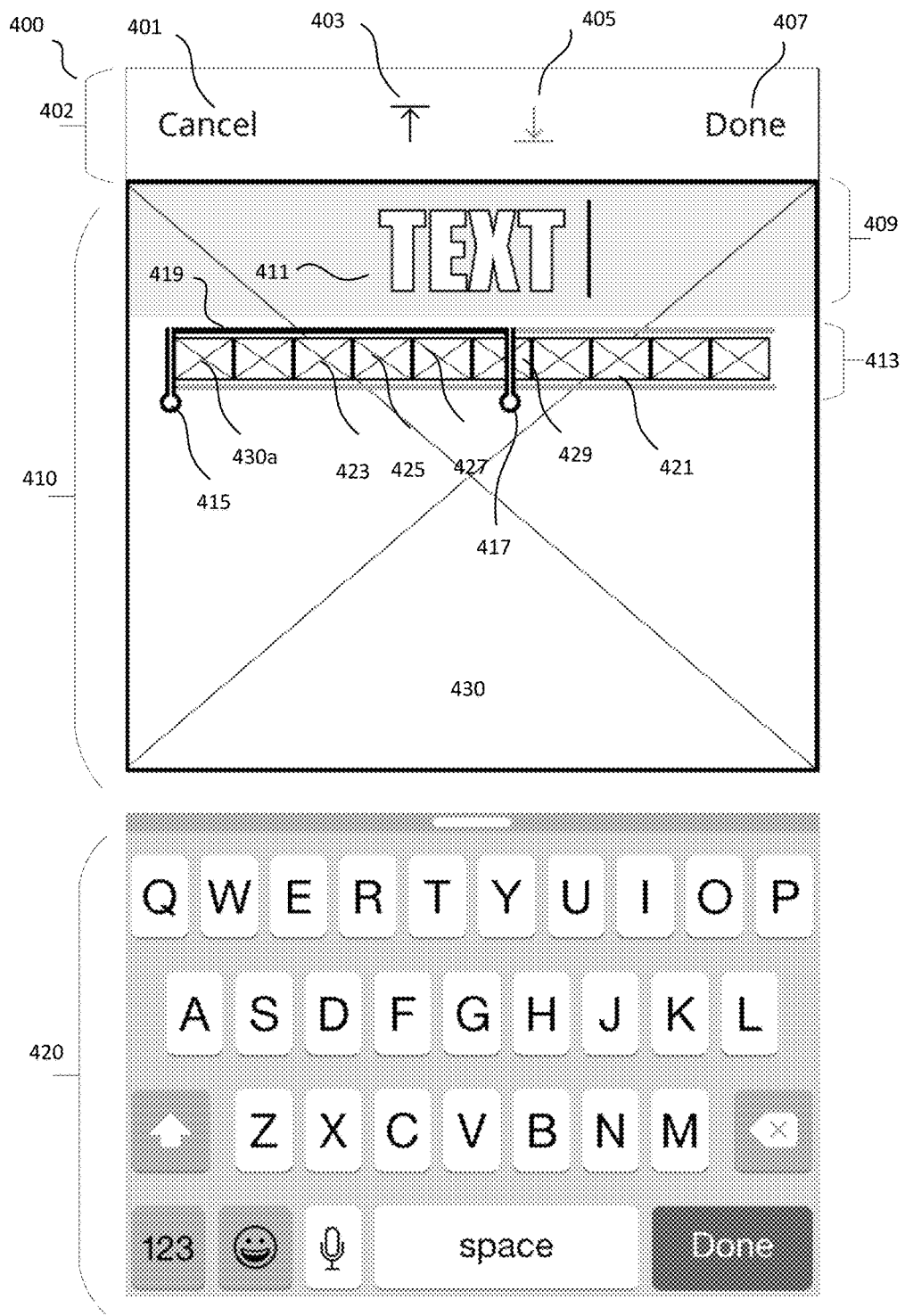
Figure 6:
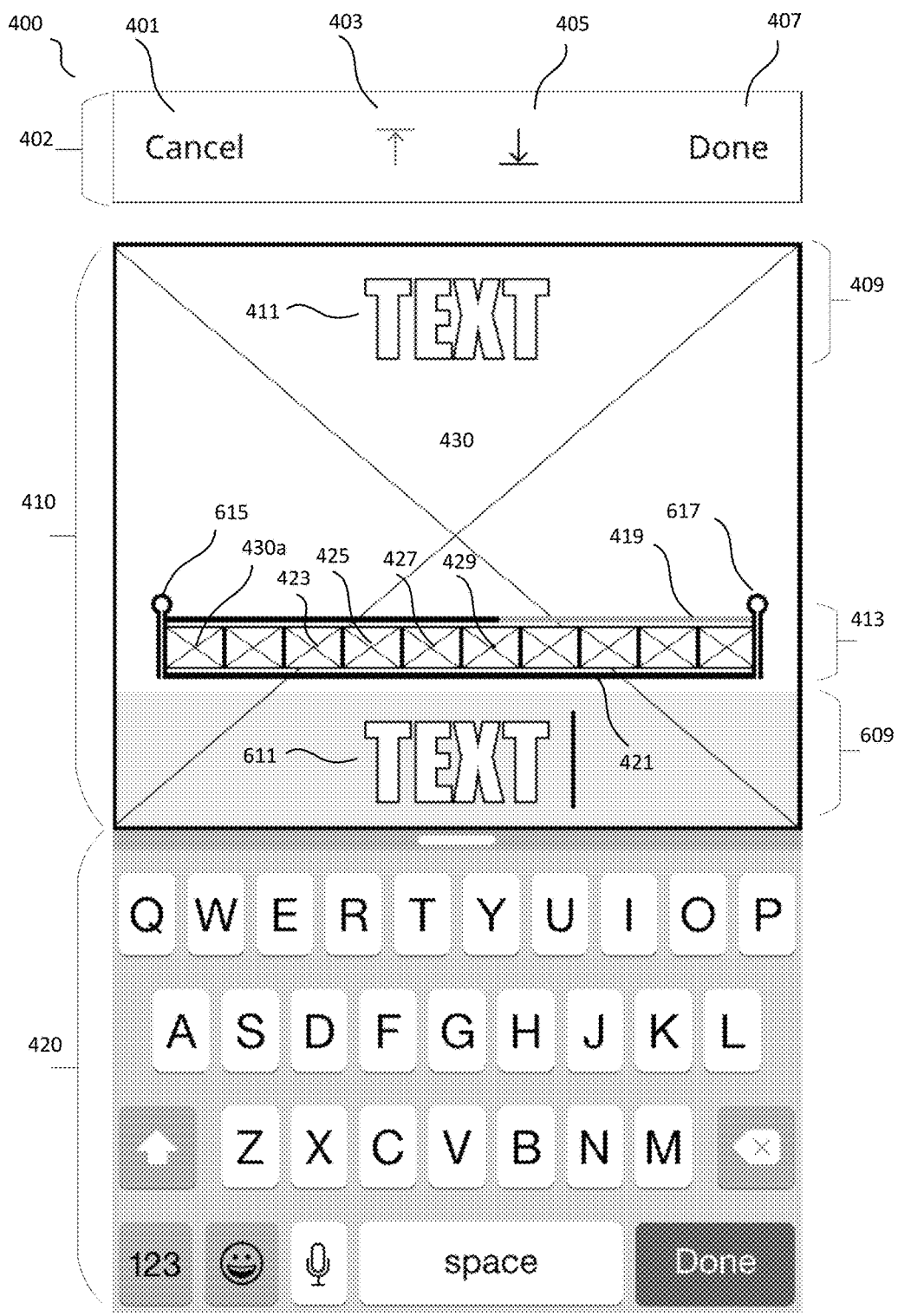

Examples of a user interface which may be generated by the client user interface layer 322 to assist a user to design and generate an animated meme according to some embodiments are shown in FIGS. 4 to 6.

FIG. 4 for example shows an image of a suitable user interface 400, following an operation of selecting a suitable sequence of images (or video) to edit and entering a first layer text object text field. FIG. 5 shows the suitable user interface 400, after the user interface has been interacted with to define an exit point for the first (or upper) layer text object. FIG. 6 shows the user interface 400, after the user interface has been interacted with to enter a second (or lower) layer text object field.

FIG. 4 for example shows an image of a suitable user interface 400. This user interface may be displayed on the user device 204 display 304 and which furthermore may be interacted with and be used to generate user interface inputs which control the animated meme design and generation operations.

The user interface 400 is shown comprising a menu or ribbon part 402. The menu or ribbon part 402 is shown in the user interface as the top or upper row of elements and may define elements for generally controlling the design and editing operations. For example the menu or ribbon part 402 may comprise a cancel button or link 401. The cancel button or link, when interacted with, cancels or ends the design and generation operation without saving any changes made in the design process. Similarly the menu or ribbon 402 may comprise a done or save button (or link) 407. The done or save button (or link) 407, when interacted with, may save the changes made and generate the animated meme in a suitable form for saving and/or communicating to further users.

In some embodiments the menu or ribbon part 402 may comprise text layer selection buttons or links. In the examples shown in the figures there are only two possible text layers a first (or upper) text layer which is displayed towards the top of the image and display and a second (or lower) text layer which is displayed towards the bottom of the image and display. To switch between the layers the example user interface comprises a first text layer selection link 403 and a second text layer selection link 405 which enables a toggling between the layers in the edit frame. In some embodiments the selection of text layers to edit and/or the generation and/or deletion of layers may use other suitable user interface buttons (or links) in order to allow the designer further flexibility of design.

In some embodiments the user interface 400 may comprise a text (or data entry) part 420 for entering and editing the text and/or objects to be overlaid over the image. In the examples shown herein the text entry part 420 is a virtual querty keyboard or keypad. However any suitable data or text entry interface may be displayed and used.

In some embodiments the user interface 400 may comprise an edit frame 410. The edit frame 410 comprises a background image element 430 over which various overlay user interface elements may be located or placed as described herein. The background image element 430 may be one of the image frames from the image frame sequence used to form the animated meme and is selected by the image sequence overlay 413 element described hereafter.

The edit frame 410 for example may comprise an image sequence overlay 413. The image sequence overlay may comprise an arrangement (for example a row or column) of selected images 430*a*, 423, 425, 427, 429 from the image sequence which is being used to form the basis of the animated meme. The selected images 430*a*, 423, 425, 427, 429 may in some embodiments be significant images (where there is a significant difference between preceding and succeeding images in the sequence) and as such may not have a uniform time distribution or period associated with each image. In some embodiments the selected images 430*a*, 423, 425, 427, 429 are a defined number of images selected equidistantly from each other in time in the sequence. The arrangement of selected images 430*a*, 423, 425, 427, 429 when placed adjacent to each other may fill a substantial part (for example the width when the arrangement is a row or height when the arrangement is a column) of the edit frame. In such a manner the image sequence overlay 413 may show the designer of the animated meme suitable points in the image sequence, and thus in time, to start and end the displayed text (or other objects).

The image sequence overlay 413 may furthermore comprise a number of sliders or track bars for setting start and end points for the text layers. In the example shown in FIG. 4 the image sequence overlay 413 comprises a first (or top) slider 419 which is associated with the first text layer and a second (or bottom) slider 421 which is associated with the second text layer. Furthermore in the example shown herein the first slider is located above the selected image sequence 430*a*, 423, 425, 427, 429 and the second slider located below the selected image sequence 430*a*, 423, 425, 427, 429 however in some embodiments the sliders may be located on the same side of the selected image sequence 430*a*, 423, 425, 427, 429. Each slider 419, 421 may comprise pointers or indicators, shown in FIG. 4 as bars projecting from the slider, which indicate the point at which (defined by time or image frame) the associated text layer starts and ends. In other words the pointers on the slider define when the text layer is displayed and removed as the sequence of images are displayed in the animated meme. In some embodiments the pointers can snap to image frame edges within the sequence of images.

In some embodiments the image sequence overlay shows an active slider and/or an active pointer for example by highlighting the slider and/or pointer relative to the other slider and/or pointers. FIG. 4, for example shows an active first slider 419 with a 'bold' first slider 419 and pointers 415 and 417 relative to the second pointer 421 which does not have any pointers shown. Furthermore in some embodiments the image sequence overlay shows the display period for the text layer. For example FIG. 4 shows that the text layer is designed to be displayed for the whole of the image sequence as the first pointer 415 is located at the start of the selected image sequence and the second pointer 417 is located at the end of the selected image sequence and the whole of the slider 419 between the pointers is highlighted or bold.

In some embodiments the active slider and active pointer (or the last interacted with pointer) can be used to determine or select the background image 430. For example in some embodiments the background image 430 may be selected as the image closest to the active pointer. For example in the example shown in FIG. 4 the active pointer may be the first pointer 415 of the first slider 419. The first pointer 415 is shown located at the start of the image sequence and therefore the first image, the image 430*a*, may be shown as the background image. As the first slider 415 is moved along the slider bar then the background image would similarly change to another image. This image may be the closest selected image from the sequence, thus as the pointer moves over image 423 the background changes to image 423, as the pointer moves over image 425 the background changes to image 425 and so on. In some embodiments the background image may be determined as being the closest (with respect to time or frame on the sequence) to one of the images from the sequence.

In the example shown in FIG. 4 there are shown two pointers 415 and 417 associated with the first slider 419 indicating or defining a time (or image frame) at which the text in the text layer is to be displayed and removed from the animated image sequence. However in some embodiments the two pointers may define when the text in the text layer is to be removed and then re-displayed. Furthermore in some embodiments there may be more than two pointers, each pointer defining or indicating a time or frame on the sequence for a state change of the text layer. For example a first pointer indicating when a piece of text is displayed, a second pointer indicating when the text is to be removed and a third pointer indicating when the text is to be displayed again. Similarly in some embodiments a single pointer may be used to indicate when to display the piece of text. For example where the text is not removed from the remaining or succeeding image of frames.

In some embodiments the user interface, for example within the menu, may allow or enable the designer to add or remove pointers from a slider.

In some embodiments the pointer may indicate whether it is a 'display text' or 'remove text' pointer. For example the pointer may have a different shading or colour or shape dependent on whether it is a 'display text' or 'remove text' pointer.

Furthermore the edit frame 410 may comprise a text entry overlay 409. The text entry overlay 409 may be associated with a specific text layer and be located within the edit frame 410 accordingly. In FIG. 4 the text entry overlay 409 shown is the text entry overlay associated with the first text layer and thus is located towards the top of the background image. The text entry overlay 409 in some embodiments may have a shading or highlighting effect to indicate the location of the text entry. The text entry overlay 409 may comprise a text element 411 (complete with flashing cursor) which displays the current text field for the text layer. In the example shown in FIG. 4 the text field 'TEXT' is shown displayed at the top of the image.

The text entry overlay 409 may be activated or deactivated by the designer selecting a slider to interact with.

With respect to FIG. 5 the example user interface 400 (from FIG. 4) is shown following an adjustment to the second pointer 417 of the first slider 419. In this example the user interface edit frame changes in the following ways.

The background image 430 changes to indicate an image associated with the second pointer 417 new location within the sequence of images. Thus for example as the pointer is shown in FIG. 5 occurring within the 'time' of the selected image 429 of the arrangement of selected images then in some embodiments the background image 430 changes to the selected image 429. In some embodiments the background image 430 is the image closest to the time or frame value associated with the second pointer.

Furthermore the slider may be highlighted for only the time period between the first pointer 415 (still located at the start of the selected image sequence) and the second pointer 417 now located at another time or frame.

With respect to FIG. 6 the example user interface 400 (as shown in FIGS. 4 and 5) is shown following a selection or toggling to the second slider. In this example the user interface edit frame changes in the following ways.

The selection or toggling to the second slider may be caused by the designer selecting the second text layer selection link 405 or selecting the second slider directly.

The background image 430 may be caused to change to indicate an image associated with the first pointer 615 location within the sequence of images. Thus for example as the first pointer 615 of the second slider occurs at the start of the sequence of images then in some embodiments the background image 430 changes to the selected image 430*a*.

Furthermore the slider may be highlighted for the time period between the first pointer 615 (located at the start of the selected image sequence) and the second pointer 617 (located at the end of the selected image sequence).

Furthermore the edit frame 410 may comprise a second text entry overlay 609. The second text entry overlay 609 may be associated with a specific text layer and be located within the edit frame 410 accordingly. In FIG. 6 the second text entry overlay 609 shown is the text entry overlay associated with the second text layer and thus is located towards the bottom of the background image. The second text entry overlay 609 in some embodiments may have a shading or highlighting effect to indicate the location of the text entry. The second text entry overlay 609 may comprise a text element 611 (complete with flashing cursor) which displays the current text field for the text layer. In the example shown in FIG. 6 the text field 'TEXT' is shown displayed at the bottom of the image.

The image sequence overlay 413 may in some embodiments be caused to move within the edit frame such that it is adjacent to the active text layer being edited. For example this is shown in FIG. 6 by the image sequence overlay 413 being caused to move adjacent the second text entry overlay 609 within the edit frame.

Furthermore in some embodiments the orientation and arrangement of the pointers associated with the sliders may be such that the pointers extend across the image sequence overlay and through other (non-active) sliders in order to indicate to the designer where the text is to be displayed relative to other text layers displays.

Thus as shown in FIG. 4 the second (bottom) slider pointers extend upwards and over the first (top) slider and shows relative to the first text layer display when the second text layer is displayed.

In such a manner the user interface 400 provides the user with the ability to design accurately placed text layer relative to each other and relative to the animated images.

In some embodiments the user interface 400 may further be configured to determine when the user taps outside the edit frame or defined frame area and cause the user interface to display a preview of the animated sequence. Similarly in some embodiments when the user does not interact with the user interface within the edit frame for a defined period or stops entering text then the user interface may be caused to trigger a preview of the animated meme to be displayed. The preview may be displayed within the edit frame area or in some embodiments cause the user interface to use a substantial part of the available area to display the preview of an animation of the image sequence with the text layer(s) displayed and removed at the defined times or frames.

Figure 7:
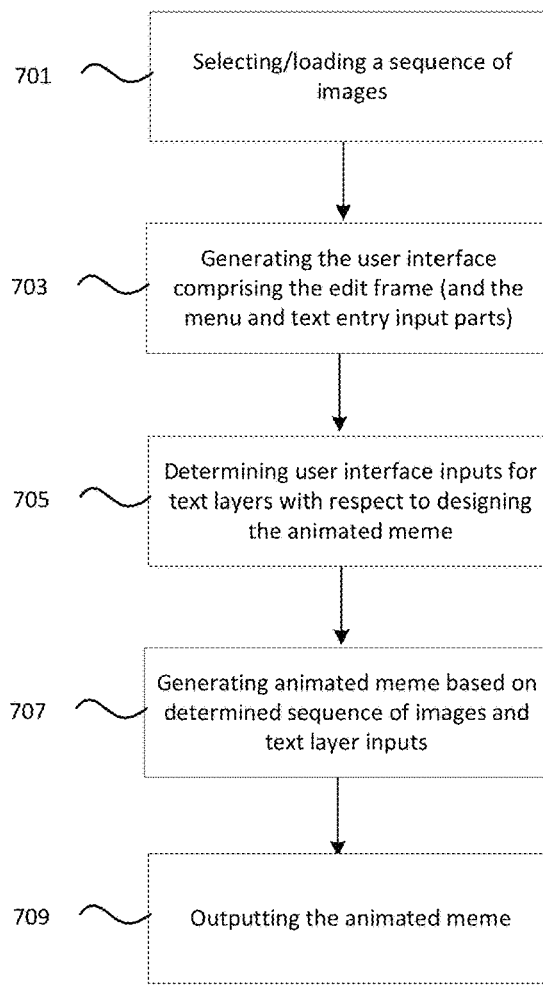
FIG. 7 is a schematic flow diagram for a method implemented by the user device according to some embodiments.

With respect to FIG. 7 a flow diagram shows the operations of designing and generation an animated meme using the user interface example described herein.

For example the user device may be caused to select/load a sequence of images (or video clip comprising a sequence of images) as the basis of the animated meme. This may be performed using any suitable selection means.

The operation selecting/loading a sequence of images is shown in FIG. 7 by step 701.

The client user interface layer 322 may then be configured to generate the user interface 400 such as shown in FIG. 4. The user interface 400 may comprise the edit frame 410, the menu bar or ribbon 402 and the data/text entry input part 420.

The operation of generating the user interface comprising the edit frame is shown in FIG. 7 by step 703.

Furthermore the client user interface layer 322 may be configured to determine user interface inputs with respect to enabling the designing of the animated meme. For example the entering of text (or objects or data) which are located with respect to the images or time within the sequence of images (and furthermore located with respect to each other where there is more than one text/data/object layer).

The operation of determining user interface inputs with respect to designing the animated meme is shown in FIG. 7 by step 705.

The client engine 320 may then be caused, after the user interface layer determines that the design process has finished, to generate an animated image file with the data/text appearing and leaving at the defined times or images within the sequence of images.

The operation of generating the animated image file with data/text appearing/leaving at the defined times or images in the image sequence is shown in FIG. 7 by step 707.

The client engine layer may then be configured to cause the generated image file to be output.

The operation of outputting the image file (for example to a server to forward to another user device is shown in FIG. 7 by step 709.

In some embodiments the animated image file is not generated but at least an indicator identifying the sequence of images, the text field (or object) and indicators indicating the defined appearance and removal of the text field within the sequence of images are output. In such embodiments the animated meme may be generated at a server or at the end user. Furthermore in some embodiments the end user may further edit the text field and defined appearance and removal pointers using a generated user interface such as shown herein.

In other words in some embodiments the animated image file is fixed (generated) by the designer or user device operated by the designer or the animated image file is editable.

Figure 8:
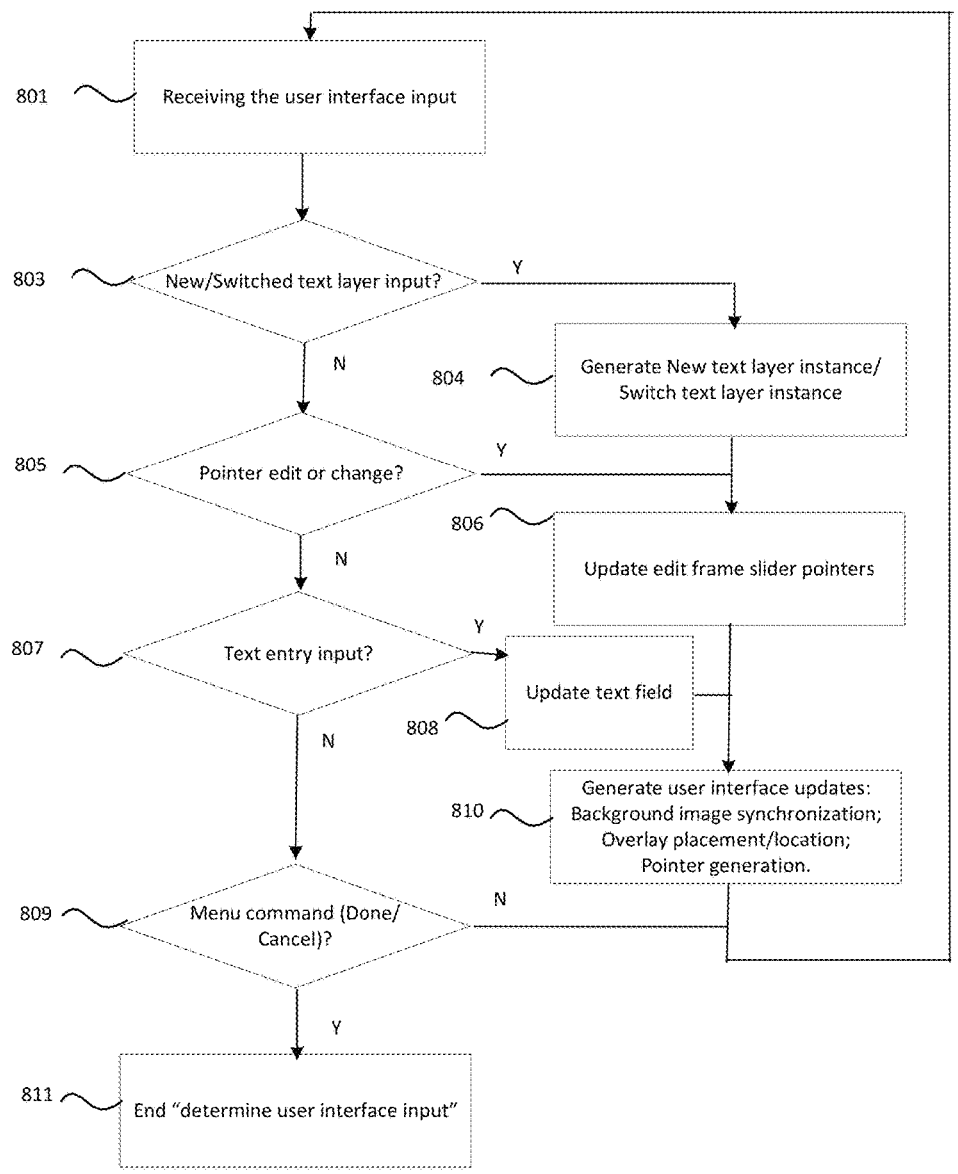
FIG. 8 is a schematic flow diagram for an example user interface input determination operation as shown in FIG. 7 according to some embodiments.

With respect to FIG. 8 the operation of determining a user interface input as shown in FIG. 7 is shown in further detail according to some embodiments.

In some embodiments of the client user interface layer 322 is configured to receive a user interface input such as from the display 304 or keypad 306 or other suitable input.

The operation of receiving the user interface input is shown in FIG. 8 by step 801.

The client user interface layer 322 may then be configured to determine whether or not the received user interface input is a new or switched text entry layer selection.

The determination of whether or not the UI input is a new or switched text entry layer selection is shown in FIG. 8 by step 803.

Where the user interface input is a new or switched text layer input then the client user interface layer 322 can be configured to generate a new text layer instance or switch to a different text layer instance.

The operation of generating a new text layer instance or switching to a difference text layer instance is shown in FIG. 8 by step 804.

Furthermore the client user interface layer may update the edit frame slider pointers with respect to the new text layer instance (in other words generate a set of initial slider pointer values defining the start and end points for the text layers) or the switched text layer instance (in other words load or retrieve the slider pointer values associated with the switched text layer instance).

The operation of updating the edit frame slider pointers is shown in FIG. 8 by step 806.

Furthermore the client user interface layer 322 can be configured to generate any user interface updates and pass these to the display. For example in some embodiments the user interface updates can include: a background image synchronisation operation to change the background image in the edit frame based on the updated edit frame slider pointer value or values; an image sequence overlay location operation moving the image sequence overlay to be adjacent the new/switched text layer position; a pointer activation operation to generate pointers on the new or switched text layer based on the updated slider pointer values; and a text layer entry highlighting operation configured to highlight the edit frame where the text layer entry is to be inserted.

The operation of generating the user interface updates is shown in FIG. 8 by step 810.

After performing the user interface updates the operation may then pass back to receiving further user interface inputs, in other words passing back to step 801.

Where it is determined that the user interface input is not a new or switched text layer entry input then the client user interface layer 322 can be configured to determine whether the user interface input is a pointer edit or change selection.

The operation of determining whether or not the user interface input is a pointer edit or change selection is shown in FIG. 8 by step 805.

Where the user interface determines that the user interface input is a pointer edit or change selection then the operations of updating the edit frame slider pointers and generating the user interface updates such as previously shown in FIG. 8 by steps 806 and 810 are performed.

Where the user interface input is determined not to be a pointer edit or change selection then the client user interface layer 322 can be configured to determine whether or not the user interface input is a text (or object or data) entry input.

The operation of determining whether the user interface input is a text (or object or data) entry input is shown in FIG. 8 by step 807.

Where the user interface input is determined to be a text (or object or data) entry input then the client user interface layer can cause the updating of the data/text field for the current active text layer.

The operation of updating the data/text field for the active text layer is shown in FIG. 8 by step 808.

The client user interface layer 322 may then be configured to generate the user interface updates such as shown in FIG. 8 by step 810.

Where the user interface input is not determined to be a text (or object or data) entry input then the client user interface layer 322 can be configured to determine whether or not the user interface input is a menu input such as a 'cancel' or 'done' command.

The operation of determining whether or not the user interface input is a menu command is shown in FIG. 8 by step 809.

Where the user interface input is determined to be menu command then the client engine layer 320 can be configured to perform the identified command, for example where the menu command is a done or cancel command to perform the operations associated with the command and end the user interface input determination operation.

The performing of an 'end' determine user interface input operation is shown in FIG. 8 by step 811.

Otherwise the operation may perform the command (or do nothing if the user input is not identified) and pass back to the receiving the user interface input operation.

Generally, any of the functions or operations described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

There is provided a user device comprising a user interface generator configured to generate a user interface for designing an animated meme comprising a sequence of images and at least one text/object layer overlaid on at least some of the sequence of images, the user interface comprising an edit frame comprising: at least one text/object overlay associated with a text/object layer, wherein the at least one text/object overlay displays an entered text/object field to be overlaid over the images; and an image sequence overlay configured to display an arrangement of selected images from the sequence of images and at least one slider associated with a text/object layer configured to define when the text/object layer is to be displayed over the sequence of images.

The user interface may further comprise a menu or ribbon part comprising a text/object layer selector element configured to activate a slider associated with the defined text/object layer indicated by the text/object layer selector element.

The menu or ribbon part may comprise an add text/layer selector element configured to generate a new slider associated with a new text/object layer.

The menu or ribbon part may comprise a cancel element configured to cancel the designing of the animated meme.

The menu or ribbon part may comprise a done element configured to save the designing of the animated meme.

The user interface element may further comprise a text/object entry part configured to enable the entry of the text/object to be displayed in the at least one text/object overlay associated with a text/object layer.

Each slider may comprise at least one pointer defining a time or frame of the sequence of images when a state change of displaying the text/object layer occurs.

Each slider may comprise a first pointer defining a start display time or frame of the sequence of images and a second pointer defining an end display time or frame of the sequence of images.

The at least one pointer may be configured to extend from the slider and overlay any of the other sliders so to enable the timewise alignment of the text/object layer with respect to another text/object layer.

The at least one pointer may be configured to extend from the slider and overlay one image from the arrangement of selected images from the sequence of images to enable the timewise alignment of the text/object layer with respect to the sequence of images.

The edit frame may comprise a background image, wherein the background image is based on the at least one pointer.

The background image may be an image from the arrangement of selected images, the image being that image overlaid by the at least one pointer.

The background image may be an image from the sequence of images closest to a frame/time value associated with the at least one pointer.

The user interface generator may be configured to generate a preview of the animated meme when a defined time period following an interaction with the user interface is determined.

The user device may further comprise an animated meme generator configured to generate an animated image comprising the sequence of images and the at least one text/object layer based on inputs from the user interface edit frame.

According to a second aspect there is provided a method for generating a user interface for designing an animated meme comprising a sequence of images and at least one text/object layer overlaid on at least some of the sequence of images, the generating of the user interface comprising generating an edit frame comprising: generating at least one text/object overlay associated with a text/object layer, wherein the at least one text/object overlay displays an entered text/object field to be overlaid over the images; and generating an image sequence overlay configured to display an arrangement of selected images from the sequence of images and at least one slider associated with a text/object layer configured to define when the text/object layer is to be displayed over the sequence of images.

Generating the user interface may further comprise generating a menu or ribbon part comprising a text/object layer selector element configured to activate a slider associated with the defined text/object layer indicated by the text/object layer selector element.

Generating the menu or ribbon part may comprise generating an add text/layer selector element configured to generate a new slider associated with a new text/object layer.

Generating the menu or ribbon part may comprise generating a cancel element configured to cancel the designing of the animated meme.

Generating the menu or ribbon part may comprise generating a done element configured to save the designing of the animated meme.

Generating the user interface element may further comprise generating a text/object entry part configured to enable the entry of the text/object to be displayed in the at least one text/object overlay associated with a text/object layer.

Generating an image sequence overlay configured to display an arrangement of selected images from the sequence of images and at least one slider may comprise generating at least one pointer defining a time or frame of the sequence of images when a state change of displaying the text/object layer occurs.

Generating an image sequence overlay configured to display an arrangement of selected images from the sequence of images and at least one slider may comprise generating a first pointer defining a start display time or frame of the sequence of images and generating a second pointer defining an end display time or frame of the sequence of images.

Generating an image sequence overlay configured to display an arrangement of selected images from the sequence of images and at least one slider may comprise generating the at least one pointer is from the slider and overlay any of the other sliders so to enable the timewise alignment of the text/object layer with respect to another text/object layer.

Generating an image sequence overlay configured to display an arrangement of selected images from the sequence of images and at least one slider may comprise generating the at least one pointer is configured to extend from the slider and overlay one image from the arrangement of selected images from the sequence of images to enable the timewise alignment of the text/object layer with respect to the sequence of images.

Generating the edit frame comprises generating a background image, wherein the background image is based on the at least one pointer.

Generating the background image may comprise determining an image from the arrangement of selected images, the image determined being that image overlaid by the at least one pointer.

Generating the background image may comprise determining an image from the sequence of images closest to a frame/time value associated with the at least one pointer.

The method may further comprise generating a preview of the animated meme when a defined time period following an interaction with the user interface is determined.

According to a third aspect there is provided a method for designing an animated meme comprising a sequence of images and at least one text/object layer overlaid on at least some of the sequence of images comprising: generating of the user interface comprising generating an edit frame comprising: at least one text/object overlay associated with a text/object layer, wherein the at least one text/object overlay displays an entered text/object field to be overlaid over the images; and an image sequence overlay configured to display an arrangement of selected images from the sequence of images and at least one slider associated with a text/object layer configured to define when the text/object layer is to be displayed over the sequence of images; and generating an animated image comprising the sequence of images and the at least one text/object layer based on inputs from the user interface edit frame.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user device comprising:
one or more hardware processors;
a hardware memory, storing instructions that when executed by the one or more hardware processors configure the processor to perform operations comprising:
displaying an edit frame comprising:
an image sequence overlay configured to display a subset of images from a sequence of images, any two adjacent images in the subset representing a contiguous portion of the sequence of images inclusively between the two adjacent images; and
at least one selectable slider associated with a text layer, the slider comprising a first pointer that, when the slider is selected, is movable to define a first end of the slider and a second pointer that, when the slider is selected, is movable to define a second end of the slider, the slider longitudinally adjacent to a first longitudinal side of one or more images in the subset that represent a contiguous portion of the sequence of images in which the text layer is displayed in an animation, each of the first and second pointers extending orthogonally from the slider and past a second longitudinal side of the one or more images.

2. The user device as claimed in claim 1, wherein the operations further comprise displaying a menu or ribbon part comprising a text layer selector element configured to activate the slider.

3. The user device as claimed in claim 2, wherein the menu or ribbon part comprises an add text layer selector element configured to generate a new slider associated with a new text layer.

4. The user device as claimed in claim 2, wherein the menu or ribbon part comprises a cancel element configured to close the edit frame.

5. The user device as claimed in claim 2, wherein the menu or ribbon part comprises a done element configured to save the animation.

6. The user device as claimed in claim 1, wherein the edit frame further comprises a text entry part configured to enable the entry of the text to be displayed in at least one overlay associated with a text layer.

7. The user device as claimed in claim 1, wherein at least one of the pointers is configured to extend from the slider and overlay other sliders so to enable a timewise alignment of the text layer with respect to another text layer.

8. The user device as claimed in claim 1, wherein at least one of the pointers is configured to extend from the slider and overlay one image of the sequence of images to enable the timewise alignment of the text layer with respect to the sequence of images.

9. The user device as claimed in claim 1, wherein the edit frame comprises a background image, wherein the background image is based on at least one of the pointers.

10. The user device as claimed in claim 9, wherein the background image is an image from the subset of images, the image being that image overlaid by the at least one of the pointers.

11. The user device as claimed in claim 9, wherein the background image is an image from the sequence of images closest to a frame/time value associated with the at least one of the pointers.

12. The user device as claimed in claim 1, wherein the operations further comprise generating a preview of the animation when a defined time period following an interaction with the edit frame is determined.

13. The user device as claimed in claim 1, wherein the operations further comprise generating an animated image comprising the sequence of images and the at least one text layer based on inputs from the edit frame.

14. A method for generating a user interface for designing an animation, the animation comprising a sequence of images and at least one text layer overlaid on at least some of the sequence of images, the method comprising: generating an edit frame, the generating of the edit frame comprising:
generating an image sequence overlay configured to display a subset of images from the sequence of images, any two adjacent images in the subset representing a contiguous portion of the sequence of images inclusively between the two selected images and at least one selectable slider associated with a text layer configured to define when the text layer is to be displayed over the sequence of images, the slider comprising a first pointer that, when the slider is selected, is movable to define a first end of the slider and a second pointer that, when the slider is selected, is movable to define a second end of the slider longitudinally adjacent to a first longitudinal side of one or more images in the subset that represent a contiguous portion of the sequence of images in which the text layer is displayed in the animation, each of the first and second pointers extending orthogonally from the slider and past a second longitudinal side of the one or more images.

15. The method as claimed in claim 14, the method further comprising generating a text entry part configured to enable the entry of the text to be displayed in at least one text overlay associated with a text layer.

16. A method for designing an animation comprising a sequence of images and at least one text layer overlaid on at least some of the sequence of images, the method comprising:
   generating an edit frame, the edit frame comprising:
      an entered text field to be overlaid over the images; and
      an image sequence overlay configured to display a subset of images from the sequence of images, any two adjacent images in the subset representing a contiguous portion of the sequence of images inclusively between the two adjacent images,
      and at least one selectable slider associated with a text layer, the slider configured to define when the text layer is to be displayed over the sequence of images, the slider comprising a first pointer that, when the slider is selected, is movable to define a first end of the slider and a second pointer that, when the slider is selected, is movable to define a second end of the slider, the slider longitudinally adjacent to a first longitudinal side of one or more images in the subset that represent a contiguous portion of the sequence of images in which the text layer is displayed in the animation, each of the first and second pointers extending orthogonally from the slider and past a second longitudinal side of the one or more images; and
   generating the animation to include the sequence of images and the at least one text layer based on inputs from the edit frame.

\* \* \* \* \*